United States Patent
Lin et al.

(10) Patent No.: US 7,047,527 B1
(45) Date of Patent: May 16, 2006

(54) METHOD FOR IDENTIFICATION OF VERSION LEVELS OF COMPONENTS ACROSS HETEROGENEOUS SYSTEMS WHILE ELIMINATING MIS-MATCHED VERSIONS

(75) Inventors: Kung Yi Lin, Irvine, CA (US); Subramaniam Ramamurthi, Rancho Santa Margarita, CA (US)

(73) Assignee: Unisys Corporation, Blue Bell, PA (US)

( * ) Notice: Subject to any disclaimer, the term of this patent is extended or adjusted under 35 U.S.C. 154(b) by 596 days.

(21) Appl. No.: 10/198,821

(22) Filed: Jul. 18, 2002

(51) Int. Cl.
*G06F 9/44* (2006.01)

(52) U.S. Cl. ...................... 717/170; 717/122

(58) Field of Classification Search ................ 717/170, 717/120–122, 168–173; 707/203
See application file for complete search history.

(56) References Cited

U.S. PATENT DOCUMENTS

| | | | | |
|---|---|---|---|---|
| 5,450,606 A | * | 9/1995 | Shiga et al. ................ | 717/170 |
| 5,485,369 A | * | 1/1996 | Nicholls et al. ............... | 705/9 |
| 5,586,322 A | * | 12/1996 | Beck et al. .................. | 707/200 |
| 5,659,735 A | * | 8/1997 | Parrish et al. ................ | 707/10 |
| 5,701,472 A | * | 12/1997 | Koerber et al. ............. | 707/203 |
| 5,778,388 A | | 7/1998 | Kawamura et al. | |
| 5,787,280 A | * | 7/1998 | Joseph et al. ................ | 707/203 |
| 5,845,077 A | * | 12/1998 | Fawcett ...................... | 709/221 |
| 5,926,636 A | * | 7/1999 | Lam et al. ................... | 719/313 |
| 6,006,034 A | * | 12/1999 | Heath et al. ................. | 717/170 |
| 6,073,141 A | | 6/2000 | Salazar | |
| 6,073,214 A | * | 6/2000 | Fawcett ...................... | 711/133 |
| 6,282,712 B1 | * | 8/2001 | Davis et al. ................. | 717/170 |
| 6,317,754 B1 | | 11/2001 | Peng | |
| 6,360,366 B1 | | 3/2002 | Heath et al. | |

* cited by examiner

*Primary Examiner*—Ted T. Vo
(74) *Attorney, Agent, or Firm*—Alfred W. Kozak; Mark T. Starr; Lise A. Rode (57) ABSTRACT

A method for providing a program which enables the identification and compatibility of software versions. The method includes the steps of performing a security verification and check to receive server software version. The program then retrieves database creation timestamp and database version, and then returns this information to the client. Finally, the program returns the information about the various software version levels that are residing in multiple databases.

3 Claims, 6 Drawing Sheets

VERSION LEVEL
COMPATIBILITY

HETEROGENEOUS CLIENT/SERVER
SOFTWARE COMPATIBILITY
VERIFICATION

FIG. 3

VERSION LEVEL
COMPATIBILITY

*FIG. 4*

SERVER CONNECTION AND
SECURITY VERIFICATION

FIG. 5

RETRIEVE SERVER
SOFTWARE VERSION

FIG. 6

DB CONNECTION AND VERSION RETRIEVAL VERIFICATION

METHOD FOR IDENTIFICATION OF VERSION LEVELS OF COMPONENTS ACROSS HETEROGENEOUS SYSTEMS WHILE ELIMINATING MIS-MATCHED VERSIONS

FIELD OF THE INVENTION

This disclosure involves methods to ensure compatibility between programs and components of a mainframe server and the client-users computer.

CROSS REFERENCES TO RELATED APPLICATIONS

This Application is related to a co-pending application, entitled "Method For Handling Multiple Program Exceptions Across Heterogeneous Systems", U.S. Ser. No. 10/053,443, filed Jan. 17, 2002 which is incorporated herein by reference.

BACKGROUND OF THE INVENTION

A heterogeneous system is one which involves high-performance, low latency multi-processors having an interconnect technology for specialized servers, such as the Unisys ClearPath NX Server. It provides a somewhat efficient means for system software in the Master Control Program (MCP) operating system and in the Windows environment, so that they may communicate with each other.

In these systems, utilization is made of a database operations center, which performs administrative functions for an enterprise database server, standard edition utilities, and also retains an enterprise database server standard edition utility command line for optional use. Further, it supports an enterprise database server, extended edition with utility-related enhancements, and provides for the utilization of Windows 98, Me, NT 4.0, or Windows 2000 compatible client platforms.

The Database Operations Center software belongs to each client-user and the software is modified extensively at each release version in order to add new features or to fix certain errors or "bugs". The client-users' computers also have server software that has its own release version levels. Further, it should be noted that the database at the mainframe could have in existence various system release version levels. This led to many types of incompatibilities, which would stop, or hang-up system operations.

It therefore became a problem that these delays or hang-ups required a certain level of synchronization between the version levels of the client user software, with the version levels in the mainframe server software. Further, it was necessary that there be a compatibility with the version levels of data in the databases. When this was not done, there would be extensive delays or complete software failures.

There are several prior art references, which have some applicability to the handling of database versions and program versions. These references are briefly discussed hereinunder.

U.S. Pat. No. 6,073,141 involves a system and method for synchronizing local versions of a database. A computer system is used for providing a current set of records to a plurality of users. The system provides a mechanism that indicates which records have been updated since a predetermined period of time. Also included is a retrieving device responsive to an indicating mechanism that retrieves one or more of the updated fields from the master database and provides those fields to one or more of the associated terminals. An updating device associated with one or more of the terminals is provided for updating each of the subsets on each of the terminals with the updated fields provided by the retrieving device. Quite contrarily, the present invention is not involved with the synchronization of updated records across different systems, but rather has to do with providing version level compatibility across heterogeneous systems.

U.S. Pat. No. 5,778,388 involves a method of processing a synchronization point in a database management system to assure a database version is using updated logs from accumulated transactions. In this operation, a list of updated page control tables is used to create in the database, the pages which are indicated in a prepared list. For a transaction accessing the pertinent updated page prior to the write operation thereof in the database, the data write operation is performed before the page is referenced, thereby enabling the access to be performed to the database without interrupting the transaction. Again, the present invention is not about synchronization of database records, but about compatibility of version levels for data management software.

U.S. Pat. No. 6,360,366 involves systems and method for automatic application version upgrading and maintenance. This relates to methods and systems for maintaining application programs on a client computer in a client-server network environment. The task of dynamically upgrading components in the application program running on the client is simplified by rendering control to the individual client, rather than to a central server. Procedures are provided to ensure speedy and error-free transfer of the required files and components through an open network environment, such as the Internet. Quite differently, the present invention involves the requesting by the user to run the highest version of software on the server. Also, in the present disclosure there is no need to update the program on the clients. In the cited reference, U.S. Pat. No. 6,360,366, if a client application is a higher version than the server, which is using a new function, then the server program will terminate abnormally in this situation.

U.S. Pat. No. 5,659,735 involves an object-oriented system for a programmed version and history database in a management system for various program components. A distributed program history database system is designed for use on a client-server network. The system consists of a plurality of program history servers, which maintain version information for various program components. A program developer, upon logging into a client terminal on the network, establishes a workspace or project and connects with one of the history servers. After connection to the history server has been made, a draft of the program configuration is retrieved from the server. The configuration draft may include information for constructing some of the program components and to "bridge" information identifying other program history servers where additional program components are located. A workspace uses the component information to assemble components, and the bridge information is used to connect to other servers and retrieve the remaining components in order to assemble the complete source code for a program in the workspace. Again, this system has to do with developing applications, while on the other hand the present invention is involved with the subject of version level compatibility across heterogeneous systems.

U.S. Pat. No. 6,317,754 involves a system for user control of version/synchronization in a mobile computing environment. A universal system is provided for synchronizing servers, which accommodates wide area mobile computing, while at the same time making the process more efficient.

This system includes a network of primary servers with high performance reliable links making up the backbone of the synchronization process to which secondary servers are linked via typically less-reliable links. This system automatically switches between whole object synchronization and differential synchronization, and permits synchronization between different systems because the semantics of the data is segregated from the synchronization due to extracting updates in a standard format and accomplishing synchronization based on a standard protocol. The present invention does not involve the subject of letting users operate to control the version or the synchronization of data. The present invention has to do with version level compatibility across heterogeneous systems.

The present system and method is useful for example, with the Unisys Corporation Data Management System II (DMSII) users, so that they are capable of accessing all databases having different and various versions. A Database Operations Center is available so that it can automatically detect the version mismatch that occurs and then return an error signal. Thus, the system can identify and communicate with the version levels of components across heterogeneous system and eliminate any of the mismatched versions. Thus, in communications between a client and the mainframe server, the mainframe server will send its own version level which can be checked by the client with the clients' version level to see whether this will be a proper connection which is workable, or if not, the connection is dropped. Further, the client can request information about the type of databases available in the server and the server reads its control file of the databases to get the proper version levels that can be communicated to the client. Here, the client can mark any database that has a higher version level than that of the mainframe server and denote it as not being useable.

SUMMARY OF THE INVENTION

Many types of heterogeneous systems involving multiple client-users that are connected to one or more mainframe servers require that there be communication between the client-users and the mainframe servers in a compatibly oriented fashion so that proper intercommunication can occur.

However, during the course of existence in many systems, there are revisions and updates made both to the client-user software and to the server software in addition to the protocols and formats used in the databases, which work with these elements.

Since many different version releases are often added to incorporate new features or to patch-up prior errors, there often occurs an incompatibility between the software versions utilized by the client-user and the software version residing in the mainframe server and/or by the associated database.

As a result, there is often a lack of coordination and compatibility, which occurs between the mainframe server and the client-user, which leads to a software failure in operations due to incompatibility of the versions involved.

The present method provides an improved set of software techniques to communicate the version of the client user to the mainframe and also provides for the mainframe server to provide its set of versions to the client. Thus, when the client requests a connection to a particular mainframe server, a particular new communication occurs so that the mainframe server sends its own personal version level to the client, and then the client-user checks this level with its own version level to make a determination of whether the mainframe server is at a lower version level. If this is the case, the connection is dropped and the client-user is informed that an incompatible connection has occurred and would not be operable.

Further, the method operates so that the client-user requests information about the databases that are available in the mainframe server. Here, the server program reads a control file in the databases and gets the proper version levels involved which it communicates to the client-user. Then, the client user marks the database to indicate that it may have higher version levels than that of the server and therefore are not usable.

GLOSSARY OF RELEVANT TERMS

1. WORKSTATION: A general-purpose computer designed to be used by one person at a time and which offers higher performance than normally found in a personal computer, especially with respect to graphics, processing power and the ability to carry out several tasks at the same time.

2. DATABASE: One or more large structured sets of persistent data, usually associated with software to update and query the data. A simple database might be a single file containing many records, each of which contains the same set of fields where each field is a certain fixed width.

3. VISUAL BASIC (VB): A popular event-driven visual programming system from Microsoft Corporation for Microsoft Windows. VB is good for developing Windows interfaces, since it invokes fragments of BASIC code when the user performs certain operations on graphical objects on-screen. It is widely used for in-house application program development and for prototyping. It can also be used to create ActiveX and COM components.

4. MIDDLEWARE: Software that mediates between an application program and a network. It manages the interaction between disparate applications across the heterogeneous computing platforms.

5. USER INTERFACE (UI): Allows users to navigate and interact with information on their computer screen by using a mouse to point, click, and drag icons and other data around on the screen, instead of typing in words and phrases. The Windows and Macintosh operating systems are examples of GUIs. The World Wide Web is an example of a UI designed to enhance navigation of the Internet, once done exclusively via terminal-based (typed command line) functions.

6. SRVCS: Also known as DBCSrvcs in this system, is a middleware program that is a bridge between the PC and the MCP system. This program is responsible for providing connections to an MCP server using proprietary NX/Pipe. This is a component of a Database Operations Center system whose task is to send a message to a host from a client and receive a message from a host and then pass it to a client.

7. COM (Component Object Model): Microsoft's framework for developing and supporting program components. COM provides the underlying services of interface negotiation, life cycle management (determining when an object can be removed from a system), licensing, and event services (putting one object into service as the result of an event that has happened to another object).

8. DATABASE OPERATIONS CENTER: A graphical user interface (GUI) that provides a client-server front-end for Enterprise Database Server Standard Edition and Enterprise Database Server Extended Edition database utilities on ClearPath servers.

Database Operations Center Functions:
  Performs administrative functions for Enterprise Database Server Standard Edition Utilities;
  Retains the Enterprise Database Server Standard Edition utility command line for optional use;
  Supports Enterprise Database Server Extended Edition utility related enhancements;
  Runs on Windows 95, Windows 98, Windows Me, Windows NT 4.0, or Windows 2000 compatible client platforms;
  Conforms to the look and feel of the Client Access Services Administration Utilities.

9. NX/PIPE: A Unisys™ software program based on COM. This program allows clients to communicate with programs in the MCP server (host) using 'Named Pipes' of Microsoft.

10. MCP (Master Control Program): Unisys Master Control Program/Advanced Systems. The comprehensive virtual memory operating system, which drives the Unisys A Series family of hardware.

11. DBCENTER SERVER: A software component in MCP environment (host) of Unisys™ system that talks to the Visual Basic Program (client) through NX/Pipe and DBCSrvcs, This program also initiates the database operations requested by the client.

12. DMSII DB: Unisys Data Management System II. The comprehensive, primary database management software package in use on Unisys A Series family of mainframe computers.

13. DATABASE CONTROL FILE: A special file required by the DMSII software on all databases. System-level information is stored in the control file, which the ACCESSROUTINES use to manage the database. The control file also provides a place for exclusive users of the database, such as DMUTILITY to mark the database as unavailable.

14. I/O (INPUT/OUTPUT): Communication between a computer and its users, its storage devices, other computers (via a network) or the outside world. The devices the computer uses to do this are called "peripherals".

15. DATABASE VERSION: A 48-bit word containing the software release level corresponding to the DMSII software in use.

16. SERVER VERSION: A 48-bit word containing the software release version level of the DBCenter Server program.

17. DATABASE CREATION TIMESTAMP: A 48-bit word containing the time of creation of the database.

18. CHECKSUM TEST: A checksum is a signature value used to verify the contents of a block of data on a disk file. When the block of data was made, the checksum was computed and placed in the block before persisting. When the block is 'read' later, the caller would compute the checksum value and see if that matches with the checksum in the block of data.

19. HETEROGENEOUS SYSTEM: Composed of unrelated parts, different in kind. Often used in the context of distributed systems that may be running different operating systems or network protocols (a heterogeneous network).

20. NAMED PIPE MECHANISMS: A feature that provides one-way or two-way communication between a server process and one or more client processes. Client applications can use named pipes to access MCP and NT server applications in a secure manner.

21. ACCESSROUTINES: The software component of DMSII product that is primarily responsible for the accessing (creating, modifying and deleting) of data in a DMSII database. The Accessroutines is also responsible for auditing all changes to the database.

22. PORT FILE: A type of file for which file operations occur between a local user process and another process on the same host or on a remote host that is reachable through a network. A port file is made up of one or more subfiles, each of which supports one dialog.

23. OBJECTBROKER: A Digital Equipment Corporation's implementation of the Object Management Group's Common Object Request Broker Architecture (CORBA). An Object Request Broker, or ORB, is software that translates a client program's requests for a service into actions by a specific server, regardless of where client and server happen to reside on the network. In order to achieve this, ORB software must be distributed across all the participating computers on the network.

24. OLE: A distributed object system and protocol from Microsoft. OLE allows an editor to "farm out" part of a document to another editor and then reimport it.

Notes:

ClearPath=TM of Unisys.

Windows NT—Copyright of Microsoft.

DESCRIPTION OF PREFERRED EMBODIMENT

Figure 1:
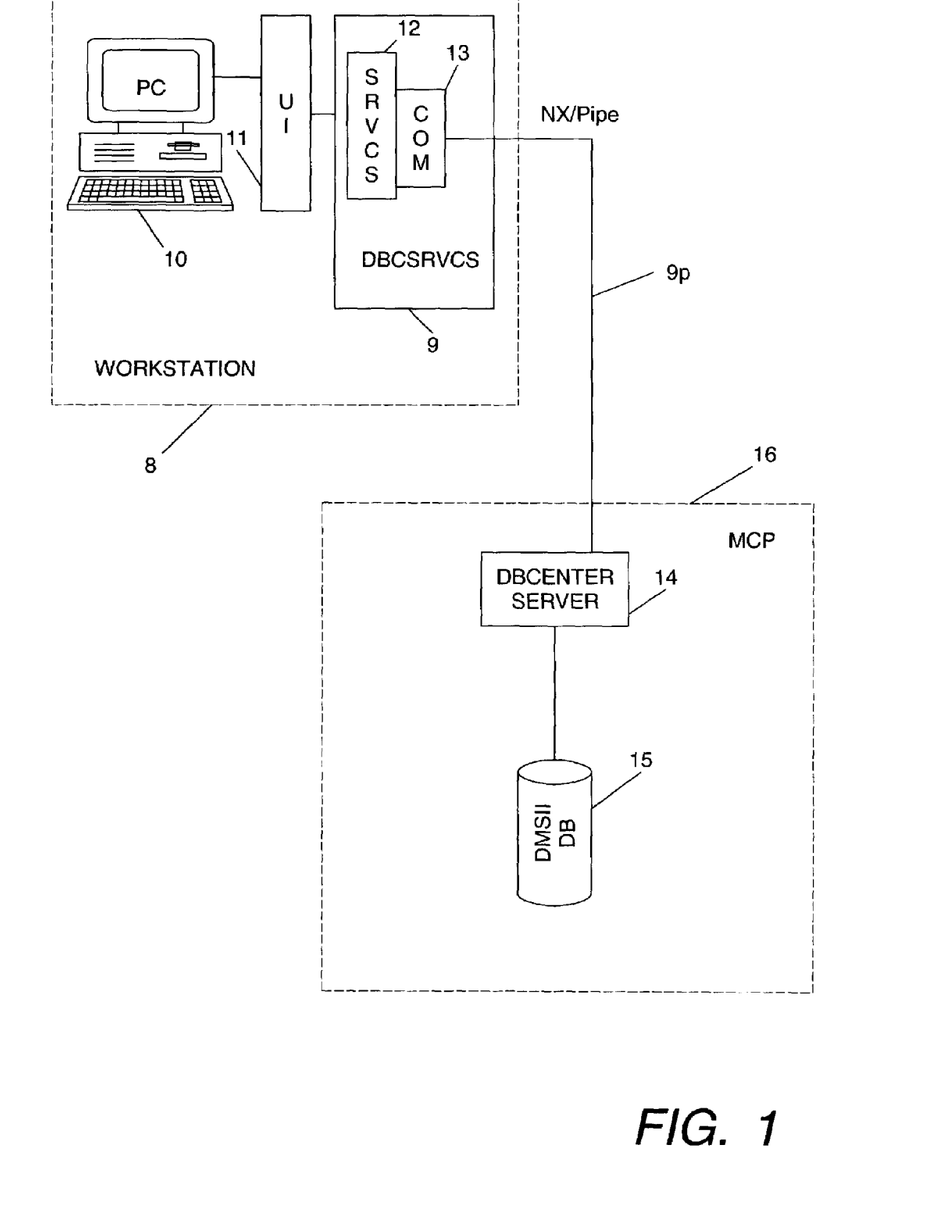
FIG. 1 is a generalized block diagram of a workstation and database server, which utilizes software versions requiring compatibility.

Referring now to the drawings and FIG. 1 in particular, a generalized block diagram is shown of the compatibility between various programming languages within in a client/server program. The diagram shows a personal computer 10, which is then linked to the User Interface 11 (UI), using a Visual Basic (VB) application 11. From there, it is linked to a SRVCS unit 12, and COM unit 13 which, joined together, form the DBCSrvcs, 9. The DBCSrvcs 9 is essentially a middleware (C++) application. The DBCSrvcs is connected via the line 9p (NX/Pipe) to the DBCenter server 14. All these applications and processes take place in the workstation 8. From the workstation 8, there is a link to the MCP 16, in which the DBCSrvcs 9 links to the DBCenter Server 14, which is a Database server programmed in the ALGOL programming language. From there, a link is made to the DMSII DB 15, which is the Database where all the information is stored.

Figure 2:
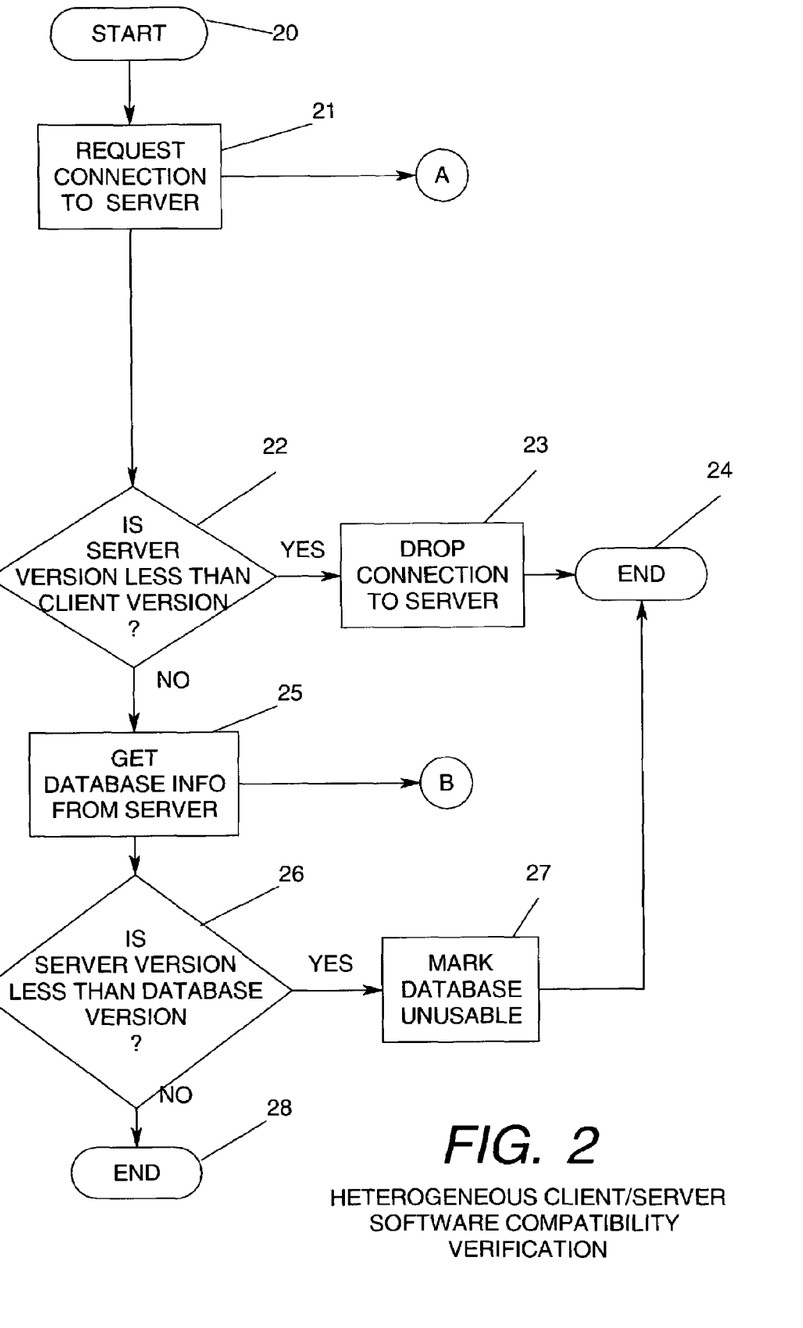
FIG. 2 is a flowchart showing how to perform software compatibility verification where heterogeneous versions of software are available.

FIG. 2 is a high-level flowchart describing, in general, how to perform the heterogeneous client/server software compatibility verification. The verification process begins with a start bubble 20, which leads to a process 21 to request a connection to the server 14. Requesting a connection is further described further in FIG. 4 via marker "A". Once the connection to the server 14 has been established, an inquiry is made as to whether or not the server version is less in numbered value than the client version (Diamond 22). If the answer to this inquiry (Diamond 22) is yes, a process to drop connection to the server is initiated (block 23), and then ends the process (bubble 24).

If the answer to this inquiry (Diamond 22) is No, a process to get the database information from the server 14 is initiated (block 25). The process in block 25 of getting version information from the server is discussed via marker B in further detail in FIG. 6. Next in FIG. 2, another inquiry is made (Diamond 26) as to whether or not the server version is less in numbered value than the database version. If the answer to this inquiry (Diamond 26) is yes, a process to mark the database unusable is initiated (Block 27), which then ends the process (bubble 24). If the answer to this inquiry (Diamond 26) is No, the entire process ends (bubble 28).

Figure 3:
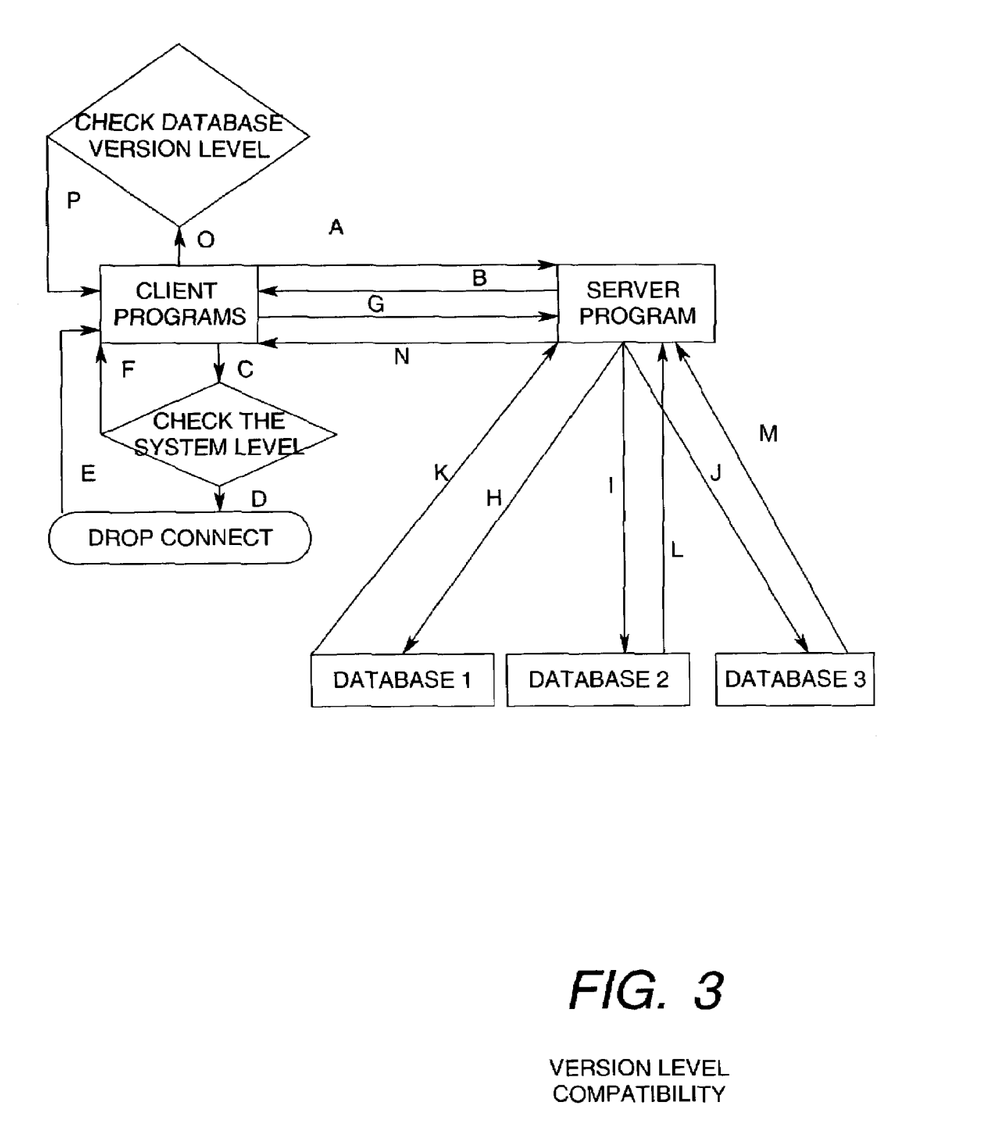
FIG. 3 is a drawing illustrating operations to establish version level compatibility.

Now referring to FIG. 3, there is seen a high level diagram illustrating version level compatibility. Line A shows a request by a client program for connection to a host server in order to get database information.

Line B is the connection response from the server program on the mainframe, which sends to a client program the proper level version of the server.

Line C is a series of steps to check the system level to see whether the server version is lower in designation than the client version, as a result of which:

(i) Line D indicates that the connection to the host server program and the client will be dropped so that the connection to the host is severed.

(ii) At line E, there is a wait period at the client-user for further user input.

(iii) At line F, the check of the system level at line step C has indicated that the version levels have succeeded with the result that at line step G, the client program sends a message to the mainframe server to go ahead and get the database information.

(iv) At line steps H, I, and J the control information for the proper level versions are collected at the server program for each particular database, 1 2 and 3.

(v) At line steps K, L and M, the control information for the proper level versions are returned to the server program.

(vi) At line step N, the database information, along with the applicable version levels, are then returned to the client.

(vii) At line step O, the client determines if the database version is greater in numerical value than the server version, and if so, then the client marks the database as unusable, and this disallows any further operations on the database.

At line step P, the client then waits for further user input. Essentially, the user must give an input so that the next screen or action is successfully shown.

As will be noted, system failures can occur due to incompatibility between the software version in the mainframe host server 14 and the software version in the client user, 10. Further, failure can also occur because of incompatibility between the individual versions involved between the databases and in the client version.

These incompatibilities and inconsistencies are now obviated due to the methodology provided in the present invention.

Figure 4:
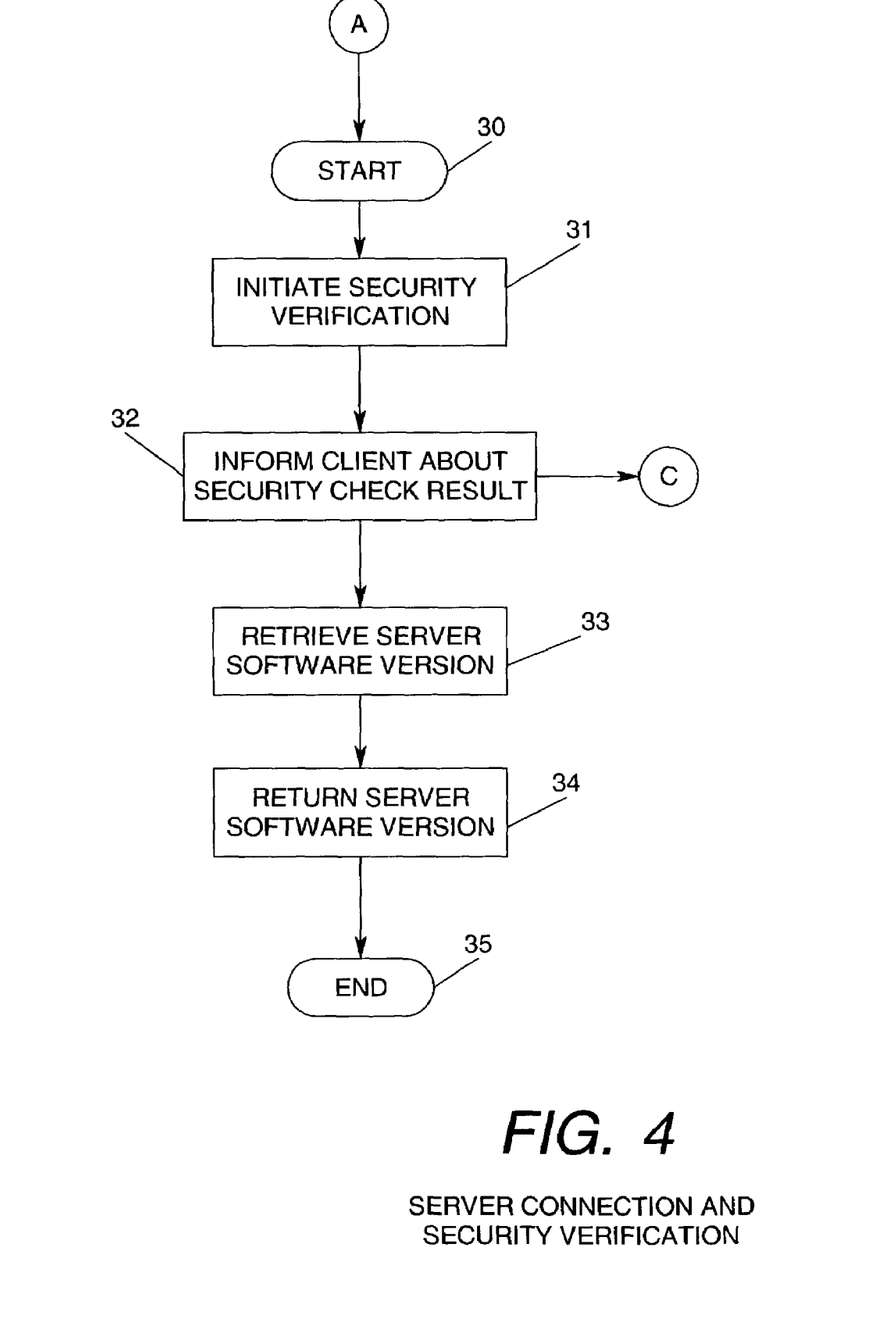
FIG. 4 is a flowchart showing the steps for a connection to a server.

Now referring to FIG. 4, there is seen a high level flowchart describing server connection and security verification. This determines the right of the client-user to access a particular version of software. Since there are two applications running on two heterogeneous operating systems, with two different user id's, the security verification ensures that the application running under the MCP server has the privilege to access database files. This process begins with a start bubble (bubble 30), which continues with a process block to initiate security verification (block 31). Next, the client is informed about the result of the security check (block 32). The server software version is then retrieved (block 33). Block 32 is described in further detail in FIG. 5 at marker "C". The information about the server version software in FIG. 4 is then returned to the client-user (block 34). The process then ends (bubble 35).

Figure 5:
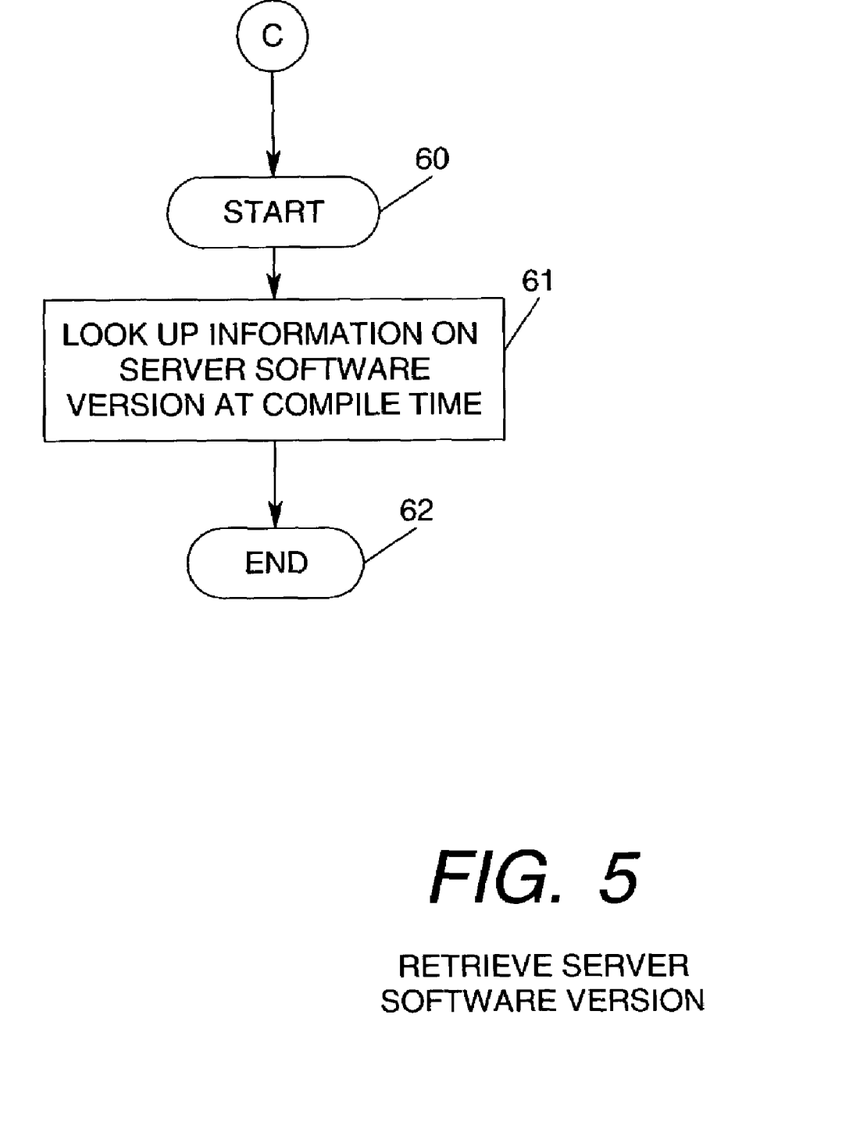
FIG. 5 is a flowchart showing how a client-user can retrieve the appropriate software version in the server.

Now referring to FIG. 5, a flowchart describing the retrieval of server software version is shown. The look up of database data/time stamp, update level and update date/time stamp are done on the MCP server. The software version is then passed back to the client so that the client can compare its software version with the server software version. This process begins with a start bubble 60. The process then proceeds to look up, at compile time, the information (numerical value) on the server software version (block 61). The process then ends (bubble 62).

Figure 6:
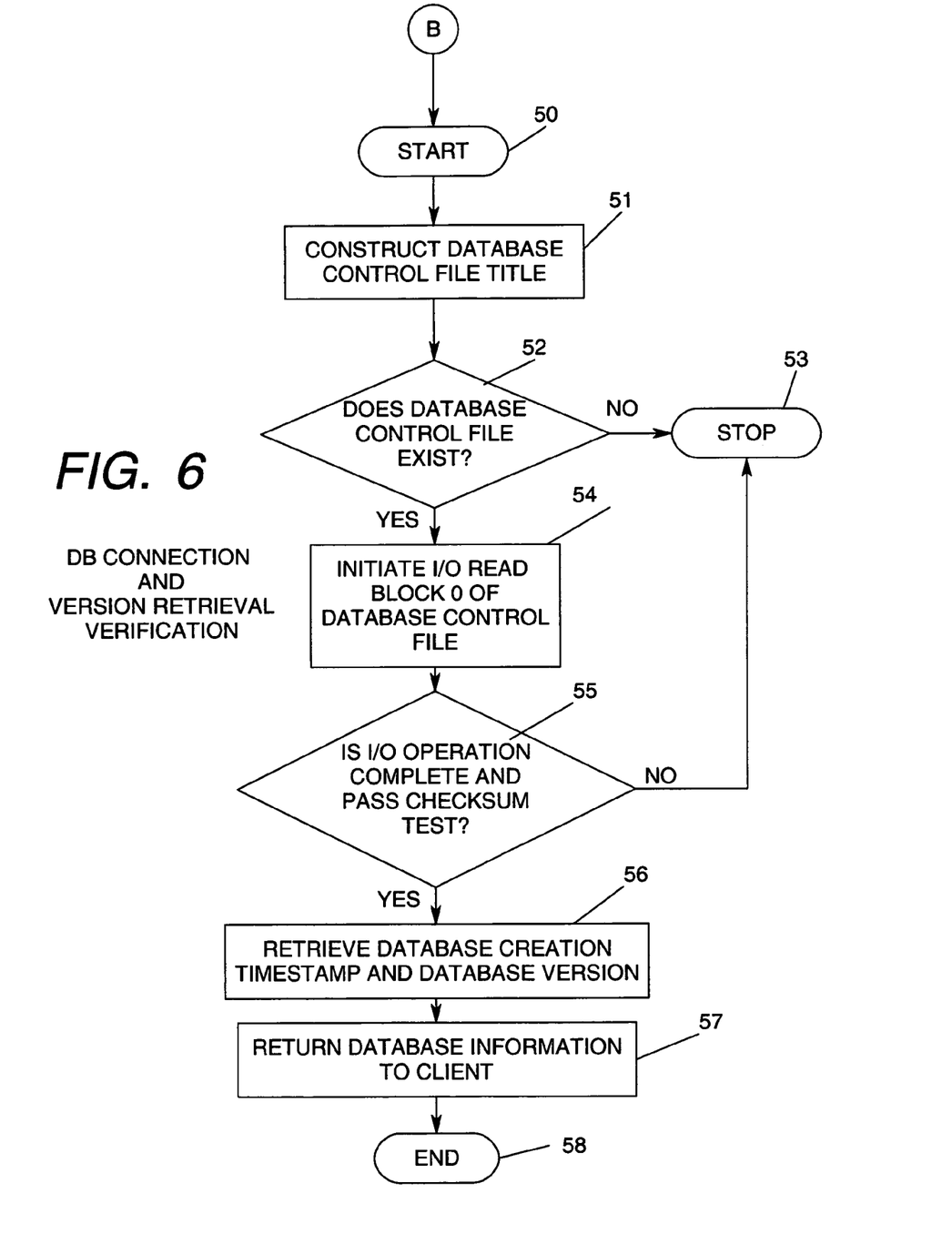
FIG. 6 is a flowchart indicating how a client-user can connect to a database, then retrieve and verify a software version.

Now referring to FIG. 6, a flowchart is shown describing the details of the database connection and version retrieval verification. These steps continue from marker B on FIG. 2. This begins with a start bubble (bubble 50). A process is initiated to construct a database control file title (block 51). This is followed by an inquiry (Diamond 52) to check to see if the physical file is present in the pack (hard drive). If the answer to this inquiry (Diamond 52) is yes, then at block 54 an I/O is initiated to read the block 0 of the database control file. The block 0 of the control file contains the table of contents of the control file, and global information about the database.

If the answer to this inquiry (Diamond 52) is no, the operation for this database has not been successful, and any access to this database will be prohibited (bubble 53). Next, another inquiry is made (Diamond 55) to check to see if the I/O operation is complete and has passed the checksum test. The reason a check is done to make sure I/O is complete and to make sure that the data block of the control file that has been read is not corrupted due to hardware/software operations. If the answer to this inquiry (Diamond 55) is No, the operation has failed, and access is no longer allowed to this database (bubble 53). If the answer to this inquiry (Diamond 55) is yes, a process is initiated to retrieve the database creation timestamp and the database version numerical value (block 56). Thus, from block zero of the control file, the fields corresponding to database creation timestamp, and the database version are retrieved into variables. The Database Operations center Server program reads the control file and retrieves the information as suggested into memory variables. Next, a process is initiated to return database information to the client 10 using existing Named Pipe mechanisms (block 57) such as NX/Pipe 9*p* of FIG. 1. The process then ends (bubble 58).

Described herein has been a system and method whereby a client user having access to a server holding multiple heterogeneous software in multiple databases is enabled to access software program versions only if the client user is properly authorized and only if the client user has client programs whose versions are compatible with the software versions residing within the multiple heterogeneous databases.

While a preferred embodiment of the invention has been described, other implementations may be organized which are still encompassed by the attached claims.

What is claimed is:

1. In a network where a client using a client-program communicates with a server having a server-program, having a version level which has access to multiple heterogeneous databases, a method for enabling compatibility of use of software version levels between said client-program and said multiple databases comprising the steps of:
   (a) requesting by a client-program for connection to said server-program to access database information regarding the software version level in each one of multiple databases;
   (b) notifying said client-program, what software level versions are available at said server;
   (c) checking the server software version level at said server to see if the server version level is lower in numerical value than the software version level of said client program;
   (d) severing the connection between said client-program and said server-program when said server version level is lower in value than said value of said client-program;
   (e) checking said software version level at said server to see if said server software version level is the same as the client-software version level, and if such is the case, to include the steps of:
      (e1) maintaining the connection between said client-program and said server-program;
      (e2) enabling said client-program to access compatible software from any one of said multiple databases via said server-program.

2. The method of claim 1 wherein step (c) includes the steps of:
   (ca) waiting, at said client-program for further information input;
   (cb) initiating a message, from said client-program to said server-program, to proceed to access information from said multiple databases as to what software level versions are available;
   (cc) receiving, by said server-program, of the various software version levels which are available in said multiple databases;
   (cd) returning, to said client-program, the information as to the various software version levels that are residing in said multiple databases.

3. A method for insuring utilization of software version levels compatible with software database version levels accessed from multiple databases by a client-user via a server means, comprising the steps of:
   (a) requesting connection from said client-user to said server means;
   (b) retrieving, by said client-user, a software version level from said server means which includes the steps of:
      (b1) initiating a security verification to check whether said client-user is allowed to access said software version level from said server means;
      (b2) informing said client-user if said software version level is available for use;
      (b3) retrieving by said client-user of said software version level if the security verification is positive;
      (b4) returning said retrieved software version level to said server means;
   (c) determining if said software version level in said server means is less in version-value than said client version and if so, then dropping the connection from said client-user to said server means and wherein step (c) includes the steps of:
      (c1) getting information from said server means on software version levels residing in said multiple databases when step (c) is not true; and wherein step (c1) includes the steps of:
         (c1a) constructing a database control file title;
         (c1b) checking to see if a database control file now exists;
         (c1c) initiating an I/O readout operation of said database control file;
         (c1d) completing said I/O readout operation with a checksum test;
         (c1e) retrieving a database creation timestamp and database software version level;
         (c1f) returning said timestamp and database software version level to said client-user;
      (c2) determining if said server software version level is less than said software database version level;
      (c3) marking said database software version level as unusable by said client-user.

* * * * *